Feb. 24, 1959  R. E. MELLENCAMP  2,874,791
MOBILE DISPLAY UNIT HAVING ELEVATABLE DRIVE DEVICES
Filed April 1, 1955  3 Sheets-Sheet 1
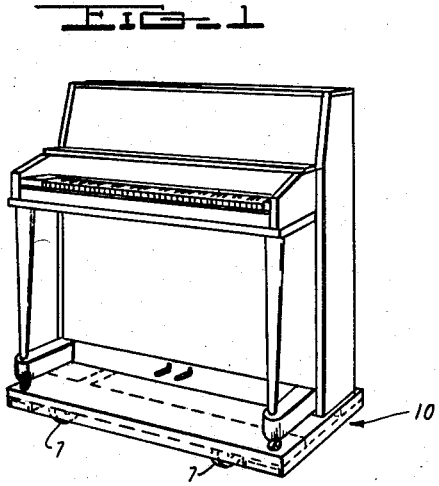
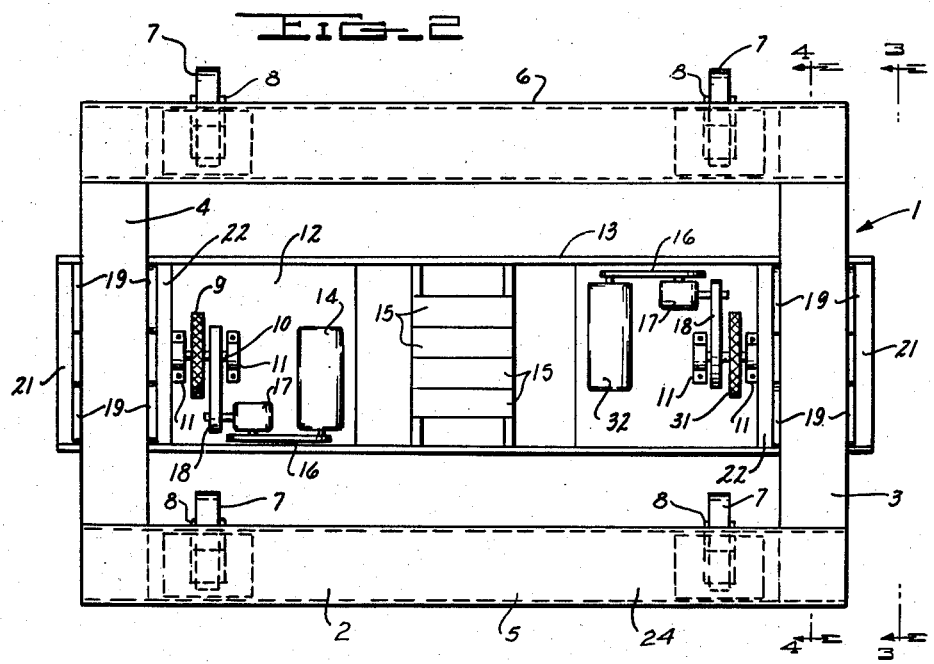
INVENTOR.
ROBERT E. MELLENCAMP
BY
SMITH, OLSEN & KOTTS
ATTORNEYS Feb. 24, 1959      R. E. MELLENCAMP      2,874,791
MOBILE DISPLAY UNIT HAVING ELEVATABLE DRIVE DEVICES
Filed April 1, 1955      3 Sheets-Sheet 2
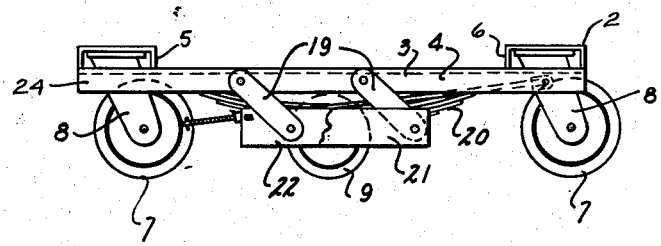
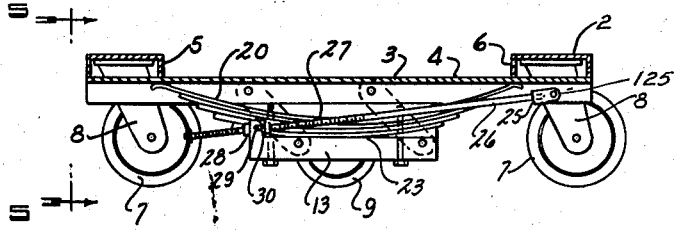
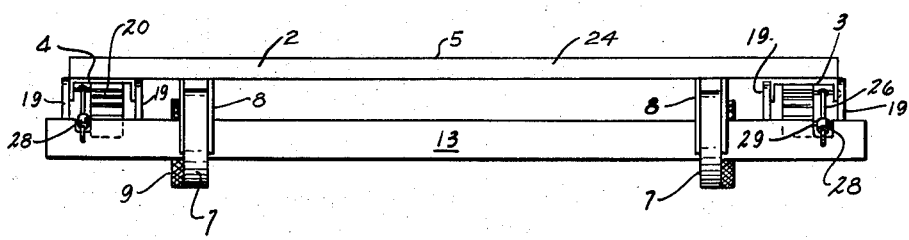
INVENTOR.
ROBERT E. MELLENCAMP
BY
SMITH, OLSEN & KOTTS
ATTORNEYS

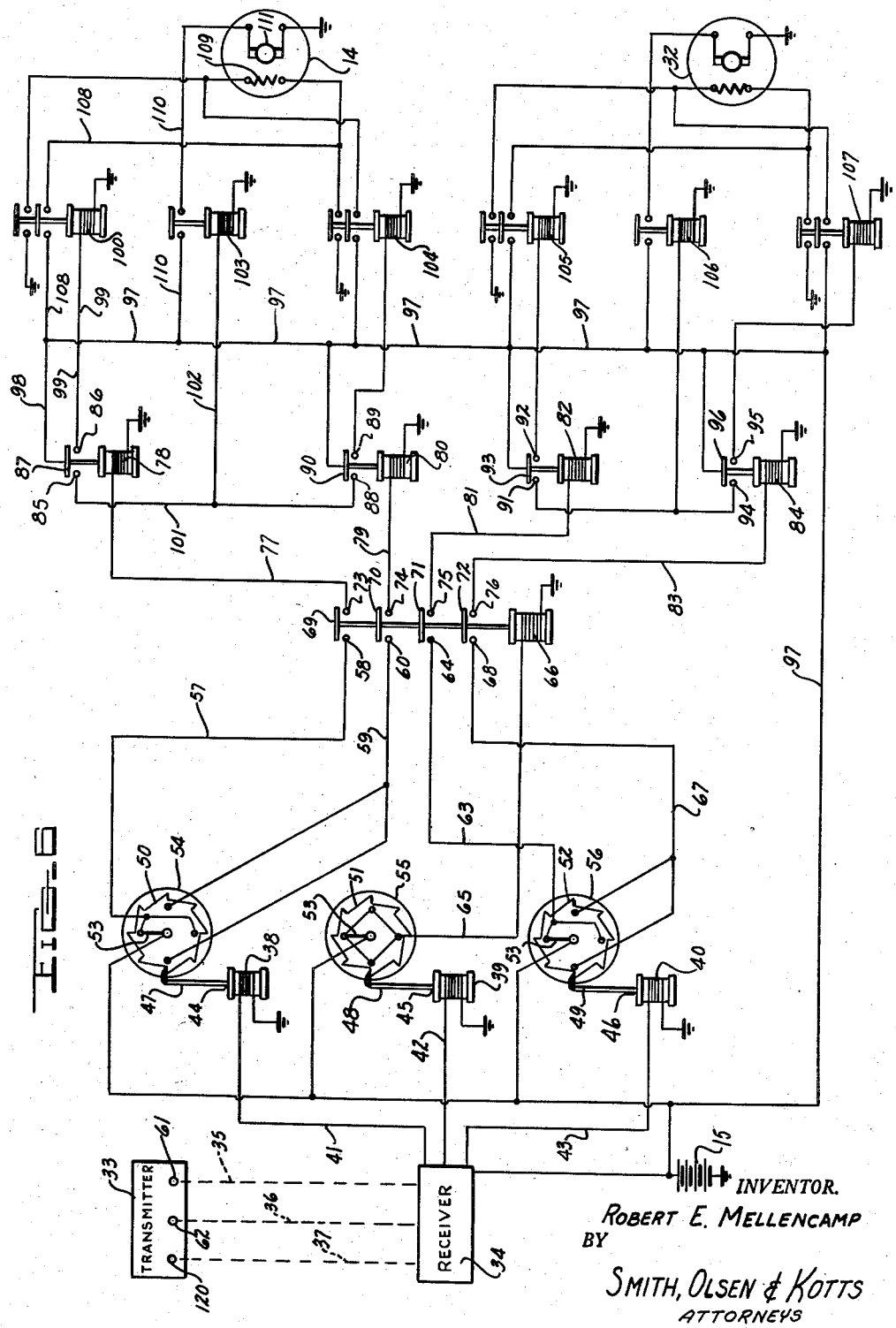

United States Patent Office 2,874,791
Patented Feb. 24, 1959

2,874,791

MOBILE DISPLAY UNIT HAVING ELEVATABLE DRIVE DEVICES

Robert E. Mellencamp, South Lyon, Mich.

Application April 1, 1955, Serial No. 498,626

5 Claims. (Cl. 180—6.5)

This invention relates to a mobile display unit.

The unit may be used for the mobile display of automobiles, appliances, theatre scenes and other devices which it is desired to move about as they are being displayed. The unit is similar to a conventional turntable in that it may be rotated around its geometrical center but without the stationary characteristics of the turntable. It has mobility in any horizontal direction, is selfpowered and preferably remotely controlled. Due to its simplicity and the comparatively light materials which may be used in its construction, it is easily transportable with little or no disassembly. It may be made in various sizes whereby to adapt it for use with the largest automobile or the smallest of displayable items.

One of its chief advantages lies in the fact that it permits control of the display at the will of the operator rather than by a mechanical means such as a track, simple turning, or the back and forth movement of the conventional wagon stage. The unit can be controlled from a balcony or other place of observation and made to move in and out between banquet tables or the like, giving the audience a very close view of the displayed item.

The unit has particular utility in the mobile display of automobiles. Conventionally automobiles are in most instances movably displayed on turntables having fixed axes of rotation. The use of such turntables for the movable display of automobiles is, however, disadvantageous in that their stationary or fixed characteristics sometimes prevent them from being readily loaded with automobiles and also prevents them from being stored or transported between periods of use. On the other hand, the mobile character of the instant display unit and the simplicity of its construction permits it to be readily loaded with an automobile and to be easily stored or transported between periods of use.

Another advantage of the unit lies in its ability to move in a plurality of different directions at the will of the operator whereby to present a more attractive and eye-catching display of the automobile.

One object of the invention is to provide a mobile display unit which includes a simply constructed and readily controlled drive mechanism whereby to adapt the unit for easily effected arcuate and straight line movements.

Another object is to provide a mobile display unit having the turning characteristics of a conventional turntable but without the disadvantage of a fixed axis of rotation characterized by the conventional turntable.

Another object is to provide a mobile display unit which is particularly adapted for easy and convenient positioning beneath a comparatively large article such as an automobile.

Another object is to provide a mobile display unit of the above-described mobility but of such construction and design as to be readily stored or transported between periods of use.

Another object is to provide a mobile display unit of the above-described mobility but wherein a minimum number of drive wheels are employed and wherein means are provided for insuring maximum traction of the drive wheels even on rough and uneven surfaces.

Another object is to provide a mobile display unit having means for putting the drive wheels out of driving engagement with the ground or floor whereby to permit easy manual propulsion of the unit without resistance from the power means.

Other objects will be apparent as the following description proceeds.

In the drawings:

Fig. 1 is a perspective view of one embodiment of the invention as it is used to display a piano.

Fig. 2 is a top plan view of another embodiment of the invention particularly adapted for supporting and displaying an automobile.

Fig. 3 is an end view of the Fig. 2 embodiment taken in the direction of line 3—3 in Fig. 2.

Fig. 4 is a sectional view taken in the direction of line 4—4 in Fig. 2.

Fig. 5 is an end view of the Fig. 2 embodiment taken in the direction of line 5—5 in Fig. 4.

Fig. 6 is a diagrammatic view of an electrical circuit which can be employed to control movement of the unit shown in Fig. 2.

Referring now to the drawings and particularly to the embodiment shown in Fig. 2 through Fig. 5 there will be seen to have been provided a display unit 1 comprised of carriage means 2 and a plurality of caster wheels 7.

Carriage means 2 includes a frame 24 comprised of two parallel channels 3 and 4 interconnected by cross channels 5 and 6. Each of these channels is preferably formed of aluminum whereby to lighten the weight of the unit. Each of caster wheels 7 is mounted for rotatable movement between the depending arms of a bracket 8. Bracket 8 is in turn mounted on the underside of channels 5 or 6 for pivotal movement around a vertical axis whereby to permit wheels 7 to take any direction dictated by rubber-tired drive wheels 9, 31.

Each of drive wheels 9, 31 is provided with an axle 10 journaled between bearings 11 positioned on the bottom wall 12 of a frame 13. Each of wheels 9, 31 is driven independently by reversible electric motors 14 and 32 powered by batteries 15. Rotation of motors 14, 32 is transmitted to wheels 9, 31 via belts 16, speed reducer units 17 and chains 18.

It is desirable when motors 14, 32 are energized that drive wheels 9, 31 be in good tractive engagement with the ground or floor even when the ground or floor surface is rough and uneven. Mechanism is therefore provided for causing the drive wheels to be positively urged into tractive engagement with the subsurface even when said wheels are positioned above a low spot therein. This urging mechanism includes two sets of parallel links 19 and two sets of leaf springs 20. Links 19 have their upper ends pivotally mounted on channels 3 and 4, and their ends pivotally mounted on crosspieces 21 and 22 of frame 13. Springs 20 are compressively retained between the webs of channels 3, 4 and seats 23 formed on frame 13. As a result, frame 13 is urged downwardly away from frame 24 and wheels 9, 31 are brought into firm tractive engagement with the subsurface even when said subsurface is rough and uneven.

At certain times it is desirable to manually move the display unit, as for instance when it is necessary to position the unit in precise position adjacent a large object such as an automobile. At such times, it is desirable to bring the drive wheels out of driving engagement with the subsurface. If this is not done, the drag of speed reducer units 17 will set up a resistance in the drive wheels whereby to prevent any manual propulsion of the unit. Various means can be provided for bringing the drive wheels out of driving engagement with the subsurface. For example, a clutch can be provided between each of wheels 9, 31 and chain 18, in which case the drive wheels can, by disengagement of the clutch elements, be made to move in non-tractive engagement with the subsurface without any drag from motors 14, 32. Another mechanism which can be employed is that shown in Fig. 4. This mechanism includes socket members 25 pivotally mounted between the end flanges of channels 3 and 4 by means of pins 125. Rotatably mounted in each of socket members 25 is a rod 26 having a threaded portion 27. Portion 27 makes meshing engagement with an internally threaded sleeve 28 which is slidably and pivotally mounted on frame 13 by means of a pin and slot connection 29, 30. When it is desired to put wheels 9, 31 out of driving engagement with the subsurface, rods 26 are turned in socket members 25 by means of speed wrenches (not shown) so as to draw sleeves 28 toward socket members 25 and thereby elevate frame 13 and wheels 9, 31 away from the subsurface. When the drive wheels are in tractive engagement with the subsurface, starting, stopping and turning of the display unit is, as previously mentioned, preferably effected by wireless remote control. Various remote control mechanisms may be employed, but one remote control mechanism which has been found satisfactory is that shown schematically in simplified Fig. 6.

With the display unit illustrated in Fig. 2, it is desirable to be able to move the unit in one or more of eight different directions. These eight directions are directly forward, turning forward to the right, rotating clockwise about its mid point, turning forward to the left, rotating counterclockwise about its mid point, turning backward to the left, turning backward to the right, and directly backward. These eight directions are effected by controlling current to motors 14 and 32. For example, when it is desired to propel the unit directly forward both motors are so energized as to turn wheels 9, 31 in the same direction. When it is desired to turn the unit forwardly to the right (considering channel 6 as "forward" of channel 5), motor 32 is stopped and motor 14 is energized in the forward direction. When it is desired to rotate the unit in a clockwise direction about its mid point, motor 14 is energized so as to turn wheel 9 in a forward direction and motor 32 is energized so as to turn wheel 31 in a backward direction. Steering of the display unit in the other five desired directions is accomplished in a similar manner by selective control of current to motors 14 and 32. Whichever direction the display unit takes wheels 9 and 31 are restricted to circumferential movements at right angles to their axles, while wheels 7 are free to take any direction dictated by wheels 9 and 31.

The circuit diagrammatically illustrated in Fig. 6 may be employed for controlling current to motors 14 and 32. The illustrated circuit includes a transmitter 33 and a receiver 34. The transmitter may be mounted at a point remote from the display unit. The remaining components of the control circuit may be mounted on the display unit.

Transmitter 33 is actuable by the use of push buttons 61, 62 and 120 to send any of three different signals 35, 36 or 37. Receiver 34 receives and converts these signals into energizer current for coils 38, 39 or 40. Thus, as a signal is received from transmitter 33 current flows from receiver 34 through lines 41, 42 or 43 to the respective coils whereby to cause downward movement of armatures 44, 45 or 46. These armatures have extending therefrom spring arms 47, 48 and 49 which engage the teeth of ratchet disks 50, 51 and 52. Each of disks 50, 51 and 52 has secured thereon a metallic strip or arm 53 which makes contact with contact buttons secured on fixed disks 54, 55 and 56. By means of brush means (not shown) current is conveyed from source 15 to each of arms 53 and thence to the contact buttons on disks 54, 55 and 56. Alternate ones of the buttons on disk 54 are connected with a line 57 which leads to a contact 58. The intervening ones of the buttons on disk 54 are connected with a line 59 which leads to a contact 60. The buttons on disk 55 are connected with a line 65 which leads to the coil of a relay 66. Alternate ones of the buttons on disk 56 are connected with a line 63 which leads to a contact 64. Intervening ones of the buttons on disk 56 are connected with a line 67 which leads to a contact 68. The "alternate" buttons on disks 54 and 56 correspond to the "forward" directions of motors 14 and 32. The "intervening" buttons on disks 54 and 56 correspond to the "reverse" directions of motors 14 and 32. The buttons on disk 55 correspond to the "on" positions of motors 14 and 32. Each of disks 50, 51 and 52 is provided with twice as many ratchet teeth as there are contact buttons. Each energization of a coil 38, 39 or 40 causes sufficient downward movement of spring arms 47, 48 or 49 to rotate disks 50, 51 or 52 through one eighth of a revolution, whereby strips 53 are moved into or out of contact with the buttons on disks 54, 55 and 56.

It will be understood that when any one of the contact buttons on disk 55 is engaged with its strip 53 the coil of relay 66 is energized, whereby to cause contact arms 69, 70, 71 and 72 to close the spaces between contacts 58, 73, contacts 60, 74, contacts 64, 75 and contacts 68, 76. Contact 73 is connected to a line 77 which leads to the coil of a relay 78. Contact 74 is connected to a line 79 which leads to the coil of a relay 80. Contact 75 is connected to a line 81 which leads to the coil of a relay 82. Contact 76 is connected with a line 83 which leads to the coil of a relay 84.

Relay 78 is provided with two contacts 85, 86 and a contact arm 87. Relay 80 is provided with two contacts 88, 89 and a contact arm 90. Relay 82 is provided with two contact buttons 91, 92 and a contact arm 93. Relay 84 is provided with two contacts 94, 95 and a contact arm 96.

Energization of relay 78 through line 77 causes current from line 97 to travel through line 98, arm 87, line 99 and the coil of a relay 100. Current from arm 87 simultaneously travels through lines 101, 102 and relay 103. In similar manner energization of relay 80 through line 79 causes simultaneous energization of relays 103 and 104, energization of relay 82 causes simultaneous energization of relays 105 and 106, and energization of relay 84 causes simultaneous energization of relays 106 and 107.

Simultaneous energization of relays 100 and 103 causes current from line 97 to flow through line 108 to the field circuit 109 of motor 14 and other current from line 97 to flow through line 110 to the armature circuit 111 of motor 14. Such current flow through circuits 109 and 111 causes motor 14 to operate in the "forward" direction. Simultaneous energization of relays 103 and 104 reverses the flow of current through field circuit 109 and thereby causes motor 14 to operate in the "reverse" direction.

Simultaneous energization of relays 105 and 106 causes motor 32 to operate in the forward direction, and simultaneous energization of relays 106 and 107 causes motor 32 to operate in the reverse direction.

Energization of the various relays is ultimately controlled by the positions of strips 53 on disks 50, 51 and 52. If the strip on disk 51 is engaged with any one of the buttons on disk 55 relay 66 will be energized, and if the strips on either of disks 50 or 52 are engaged with their contact buttons one or both of motors 14, 32 will be energized.

Stopping of the display unit may be effected by depressing button 62 or by depressing buttons 61, 120. Button 62 acts as a master control over both of motors 14 and 32, and buttons 61, 120 act as controls only over their respective motors. An advantage of master control button 62 is that it permits stoppage of both motors 14 and 32 without changing the positions of strips 53 on disks 50 and 52. Thus, if it is desired to momentarily stop the display unit and then send it forth again in the same path as before stoppage it is only necessary to depress button 62 twice, once to stop the unit and once to start the unit. If button 62 was not employed, buttons 61 and 120 would each have to be depressed four times, once to stop each motor and three times to rotate each of disks 50 and 52 around to the desired contact button.

When it is desired to change the direction of either motor 14 or 32 the respective one of buttons 61, 120 is depressed twice, once to disengage strip 53 from a contact button and a second time to position strip 53 in engagement with the next contact button. The action of coils 38 and 40 is so quick that during the periods when strips 53 are being shifted from one button to the next button there is very little, if any, jerk in the display unit movement.

Variations in the control means may be made but whatever type control means is employed the mobile characteristics of the display unit will be retained. As was stated previously the unit shown in Figs. 2 through 5 is particularly adapted for supporting an automobile. Preferably the automobile is supported with its frame resting directly on the upper faces of channels 5 and 6.

Mounting of an automobile on the display unit may be accomplished in four operations. Initially chains (not shown) or other tie down means are locked around each of the automobile axles and the automobile frame. The purpose of these tie down mechanisms is to prevent the automobile springs from causing the automobile wheels to move downwardly out of their normal positions when the automobile is in position on the display unit.

The second step in mounting an automobile on the unit is to jack up the automobile at its front and rear ends. The unit can then be moved under the automobile and the jacks lowered whereby to leave the automobile resting on the display unit. With the automobile in position on the display unit the automobile tires are preferably about one inch above the floor surface, thereby presenting the automobile with a desirably low silhouette. The use of tie down mechanisms between the automobile frame and axles maintains the automobile wheels in their normal positions.

The invention may, if desired, be employed merely as a replacement for a conventional turntable and without the translational mobility achieved with the embodiment shown in Figs. 2 through 5. For example, one embodiment of the invention (not shown) provides structure whereby the display unit can be clamped on the automobile frame. Raising and lowering jacks are employed in this embodiment and are preferably hydraulically operated from within the automobile. This embodiment permits an automobile to be driven into the display area with the display unit clamped on the automobile frame in raised position beneath the automobile, the hydraulic jacks actuated to lower the display unit into a position with its drive wheels in tractive engagement with the floor of the display area, and the control mechanism (preferably located in this embodiment in the automobile) actuated to rotate the automobile clockwise and/or counterclockwise, after which the hydraulic jacks can again be actuated to elevate the display unit and permit the automobile to be driven out of the display area.

The units shown in Figs. 1 and 2 are substantially rectangular in plan. If desired, however, they can be made circular or of another configuration. One embodiment of the invention which is not shown in the drawings, but which is particularly suited to theatre work or the display of appliances, includes a rotatable carriage or stage powered by drive units as in the Fig. 2 embodiment, but provided with a plurality of concentric rings which carry screen units. Rotation of the rings causes movement of the screen units and serves to alternately expose and enclose the displayed item on the stage. An advantage of this embodiment, as compared with similar prior art mechanisms, lies in the fact that it avoids the necessity of hanging curtains or screens from a superjacent supporting structure.

Having thus described my invention, I claim:

1. A mobile display unit comprising a horizontal carriage; a plurality of caster wheels carried at opposite extremities of said carriage for swivelling movements around vertical axes whereby to fully support said carriage for movement in any horizontal direction; a frame suspended from a central area of the carriage; spring means between the carriage and frame urging said frame toward the sub surface; manually actuable means for raising said frame in opposition to the spring means; two spaced drive wheels carried by the frame so as to be raisable and lowerable therewith; said drive wheels having their axles aligned on a horizontal line extending through the geometrical center of the carriage; a separate reversible motor carried on the frame, one for each of the drive wheels; drive means between each motor and its drive wheel; and means for selectively actuating the motors; whereby the display unit can be reversibly rotated around its geometrical center by driving the motors in opposite directions or propelled in rectilinear directions, by driving the motors in the same direction or turned about either of the drive wheels by actuating one motor while deactuating the other motor.

2. A mobile display unit comprising a horizontal carriage; a plurality of caster wheels carried at opposite extremities of said carriage for swivelling movements around vertical axes whereby to fully support said carriage for movement in any horizontal direction; a frame; two sets of parallel links suspending the frame from the carriage; spring means between the carriage and frame urging said frame toward the sub surface; two spaced drive wheels carried by the frame so as to be raisable and lowerable therewith; said drive wheels having their axles aligned on a horizontal line extending through the geometrical center of the carriage; a separate reversible motor carried on the frame, one for each of the drive wheels; drive means between each motor and its drive wheel; and means for selectively actuating the motors; whereby the display unit can be reversibly rotated around its geometrical center by driving the motors in opposite directions, or propelled in rectilinear directions, by driving the motors in the same direction or turned about either of the drive wheels by actuating one motor while deactuating the other motor.

3. A mobile display unit comprising a horizontal carriage; a plurality of caster wheels carried at opposite extremities of said carriage for swivelling movements around vertical axes whereby to fully support said carriage for movement in any horizontal direction; a frame suspended from a central area of the carriage; spring means between the carriage and frame urging said frame toward the sub surface; two spaced drive wheels carried by the frame so as to be raisable and lowerable therewith; said drive wheels having their axles aligned on a horizontal line extending through the geometrical center of the carriage; a separate reversible motor carried on the frame, one for each of the drive wheels; drive means between each motor and its drive wheel; and means for selectively actuating the motors; whereby the display unit can be reversibly rotated around its geometrical center by driving the motors in opposite directions or propelled in rectilinear directions, by driving the motors in the same direction or turned about either of the drive wheels by actuating one motor while deactuating the other motor.

4. A mobile display unit comprising a horizontal carriage; a plurality of caster wheels carried at opposite extremities of said carriage for swivelling movements around vertical axes whereby to fully support said carriage for movement in any horizontal direction; two spaced drive wheels; drive wheel support means floatably carried by the carriage; spring means between the carriage and drive wheel support means urging the drive wheels toward the sub surface; manually actuable means for raising the drive wheels in opposition to the spring means, the arrangement being such that the drive wheels are not required to support the weight of the display unit and its contents; said drive wheels having their axles aligned on a horizontal line extending through the geometrical center of the carriage; separate reversible motor means carried on the display unit for each of the drive wheels; drive means between each motor means and its drive wheel; and means for selectively actuating the motor means; whereby the display unit can be reversibly rotated around its geometrical center by driving the two separate motor means in opposite directions, or propelled in rectilinear directions by driving the two separate motor means in the same direction, or turned about either of the drive wheels by actuating one motor means while deactuating the other motor means.

5. A mobile display unit comprising a horizontal carriage; a plurality of caster wheels carried at opposite extremities of said carriage for swivelling movements around vertical axes whereby to fully support said carriage for movement in any horizontal direction; two spaced drive wheels; drive wheel support means floatably carried by the carriage; spring means between the carriage and drive wheel support means urging the drive wheels toward the sub surface, the arrangement being such that the drive wheels are not required to support the weight of the display unit and its contents; said drive wheels having their axles aligned on a horizontal line extending through a central point of the carriage; separate reversible motor means carried on the display unit for each of the drive wheels; drive means between each motor means and its drive wheel; and means for selectively actuating the motor means; whereby the display unit can be reversibly rotated around the aforementioned central point by driving the two separate motor means in opposite directions, or propelled in rectilinear directions by driving the two separate motor means in the same direction, or turned about either of the drive wheels by actuating one motor means while deactuating the other motor means.

References Cited in the file of this patent

UNITED STATES PATENTS

| | | |
|---|---|---|
| 988,677 | Vanmanen | Apr. 4, 1911 |
| 1,161,424 | Thode | Nov. 23, 1915 |
| 1,214,673 | Harrah | Feb. 6, 1917 |
| 1,282,329 | Turner | Oct. 22, 1918 |
| 1,283,211 | Kintzing | Oct. 29, 1918 |
| 1,512,755 | Galbraith | Oct. 21, 1924 |
| 2,244,528 | Schur | June 3, 1941 |
| 2,254,104 | Joy | Aug. 26, 1941 |
| 2,749,996 | Parker et al. | June 12, 1956 |
| 2,768,697 | Shotwell | Oct. 30, 1956 |

FOREIGN PATENTS

| | | |
|---|---|---|
| 258,875 | Switzerland | May 16, 1949 |